(12) United States Patent
Christ et al.

(10) Patent No.: US 9,803,543 B2
(45) Date of Patent: Oct. 31, 2017

(54) DEVICE AND METHOD FOR REDUCING ROTATIONAL IMBALANCES OF A DRIVE TRAIN FOR A HYBRID VEHICLE

(71) Applicant: Bayerische Motoren Werke Aktiengesellschaft, Munich (DE)

(72) Inventors: Thomas Christ, Munich (DE); Jonas Mueller, Munich (DE); Maximilian Skibbe, Munich (DE)

(73) Assignee: Bayerische Motoren Werke Aktiengesellschaft, Munich (DE)

( * ) Notice: Subject to any disclaimer, the term of this patent is extended or adjusted under 35 U.S.C. 154(b) by 368 days.

(21) Appl. No.: 14/513,894

(22) Filed: Oct. 14, 2014

(65) Prior Publication Data

US 2015/0053165 A1  Feb. 26, 2015

Related U.S. Application Data

(63) Continuation of application No. PCT/EP2013/054344, filed on Mar. 5, 2013.

(30) Foreign Application Priority Data

Apr. 20, 2012  (DE) .......................... 10 2012 206 559

(51) Int. Cl.
*B60W 20/00* (2016.01)
*F02B 75/06* (2006.01)
(Continued)

(52) U.S. Cl.
CPC .............. *F02B 75/06* (2013.01); *B60W 20/15* (2016.01); *B60W 30/18027* (2013.01);
(Continued)

(58) Field of Classification Search
CPC ................. B60W 20/15; B60W 30/20; B60W 2030/206; B60W 10/08;
(Continued)

(56) References Cited

U.S. PATENT DOCUMENTS 6,102,144 A * 8/2000 Lutz .......................... B60K 6/48
180/65.25
6,158,405 A * 12/2000 Masberg .................. B60K 6/26
123/192.1
(Continued)

FOREIGN PATENT DOCUMENTS

DE            3731984 A1    4/1989
DE      195 32 128 A1       3/1997
(Continued)

OTHER PUBLICATIONS

Chinese Office Action issued in counterpart Chinese Application No. 201380005225.X dated Jan. 14, 2016 with English-language translation (fifteen (15) pages).
(Continued)

*Primary Examiner* — J. Allen Shriver, II
*Assistant Examiner* — Steve Clemmons
(74) *Attorney, Agent, or Firm* — Crowell & Moring LLP

(57) ABSTRACT

A system and a method for reducing a rotational imbalance of a drive train of a hybrid vehicle are provided. The drive train includes an internal-combustion engine, an electric machine, and a crankshaft. A reduction or nullification of the rotational imbalance takes place by actuating the electric machine. The actuation is implemented as an adaptive feed forward control, which provides an actuation signal for the electric machine. The actuation signal represents a desired torque to be generated by the electric machine, so that the electric machine outputs a torque that is at least approximately inverse with respect to the rotational imbalance to the crankshaft for the superimposition of the torque generated by the internal-combustion engine.

4 Claims, 3 Drawing Sheets

(51) Int. Cl.
*B60W 50/00* (2006.01)
*B60W 30/18* (2012.01)
*B60W 30/20* (2006.01)
*B60W 20/15* (2016.01)
*B60W 10/08* (2006.01)

(52) U.S. Cl.
CPC ............ *B60W 30/20* (2013.01); *B60W 50/00* (2013.01); *B60W 10/08* (2013.01); *B60W 2030/206* (2013.01); *B60W 2050/0012* (2013.01); *B60W 2510/0638* (2013.01); *B60W 2510/081* (2013.01); *B60W 2710/083* (2013.01)

(58) Field of Classification Search
CPC ..... B60W 2510/0638; B60W 2510/81; B60W 2710/083; F16F 15/18; B60K 6/48
See application file for complete search history.

(56) References Cited

U.S. PATENT DOCUMENTS

| | | | | |
|---|---|---|---|---|
| 6,565,479 | B2* | 5/2003 | Fattic | B60K 6/485 |
| | | | | 477/3 |
| 6,720,746 | B2* | 4/2004 | Amann | B60L 15/20 |
| | | | | 180/65.1 |
| 6,756,758 | B2* | 6/2004 | Karikomi | G05D 19/02 |
| | | | | 180/197 |
| 6,842,673 | B2* | 1/2005 | Zhang | B60K 6/48 |
| | | | | 180/65.25 |
| 7,633,257 | B2* | 12/2009 | Sakamoto | B60W 10/08 |
| | | | | 318/611 |
| 7,670,256 | B2* | 3/2010 | Winkelmann | B60W 10/08 |
| | | | | 477/5 |
| 7,783,402 | B2* | 8/2010 | Sawada | B60W 10/08 |
| | | | | 180/65.1 |
| 8,510,007 | B2* | 8/2013 | Mori | B60K 6/48 |
| | | | | 180/65.21 |
| 8,666,580 | B2* | 3/2014 | Hashimoto | B60K 6/365 |
| | | | | 180/65.265 |
| 8,935,030 | B2* | 1/2015 | Oikawa | B60K 6/445 |
| | | | | 180/65.1 |
| 2010/0332070 | A1* | 12/2010 | Mueller | B60W 10/02 |
| | | | | 701/31.4 |
| 2012/0083953 | A1 | 4/2012 | Izawa et al. | |
| 2012/0091934 | A1 | 4/2012 | Lindberg | |
| 2013/0173108 | A1 | 7/2013 | Hashimoto | |
| 2014/0100733 | A1* | 4/2014 | Christ | B60W 10/08 |
| | | | | 701/22 |

FOREIGN PATENT DOCUMENTS

| | | |
|---|---|---|
| DE | 195 32 163 A1 | 3/1997 |
| DE | 197 21 298 A1 | 11/1998 |
| DE | 10 2005 015 484 A1 | 5/2006 |
| DE | 10 2010 020 148 A1 | 12/2010 |
| WO | WO 2012/029170 A1 | 3/2012 |

OTHER PUBLICATIONS

Chinese-language Office Action issued in counterpart Chinese Application No. 201380005225.X dated Jul. 1, 2016 with English translation (14 pages).
International Search Report (PCT/ISA/210) dated Jun. 3, 2013, with partial English translation (Eight (8) pages).
German Search Report dated Apr. 22, 2013, with partial English translation (Ten (10) pages).
Xiuhe Wang, "Permanent Magnet Motor (2nd Edition)," China Electric Power Press (2011), pp. 294-297.
Jian-Iong Zhang et al., "Simulation Research on Hybrid Electric Vehicle Handing and Stability Fuzzy Control," Journal of System Simulation, vol. 21, No. 20, 2009, with English abstract, pp. 6600-6607.
Guijun Cao et al., "Experimental Investigation of the Control System of a Diesel-Hybrid Powertrain," Journal of Tsinghua University (Science and Technology), vol. 49, No. 11, 2009, with English abstract, pp. 1843-1847 and p. 1851.
Chinese Office Action issued in counterpart Chinese Application No. 201380005225.X dated Nov. 21, 2016 with English-language translation (eighteen (18) pages).
Ding et al., "The Theory and Technology of Discrete Spectrum Correction", Science Press, First Edition, 2008, pp. 250-270.
Wu et al., "Design of Internal Combustion Engine", Beijing Institute of Technology Press, First Edition, 1990, pp. 173-196.

* cited by examiner

DEVICE AND METHOD FOR REDUCING ROTATIONAL IMBALANCES OF A DRIVE TRAIN FOR A HYBRID VEHICLE

CROSS REFERENCE TO RELATED APPLICATIONS

This application is a continuation of PCT International Application No. PCT/EP2013/054344, filed Mar. 5, 2013, which claims priority under 35 U.S.C. §119 from German Patent Application No. 10 2012 206 559.8, filed Apr. 20, 2012, the entire disclosures of which are herein expressly incorporated by reference.

BACKGROUND AND SUMMARY OF THE INVENTION

The invention relates to a system and a process for the reduction of a rotational imbalance of a drive train of a hybrid vehicle. The drive train includes an internal-combustion engine, an electric machine, and a crankshaft.

A rotational imbalance is a summation of all periodical interfering torques as a result of mass moments of inertia, combustion peaks, and secondary effects that are created at the crankshaft by the operation of the internal-combustion engine. The rotational imbalances are superimposed on the output torque supplied by the internal-combustion engine with several periodical interferences. It is known to combat rotational imbalances by way of passive absorption elements, such as a dual mass flywheel (ZMS) or a rotational-speed-adaptive absorber (DAT).

Likewise, active compensation functions are known. Within the scope of an active process, automatically controlled actuators are used, as appropriate in connection with a passive member. Active compensation functions take into account the effect of the optionally installed passive members, such as the ZMS and the DAT, and carry out an active compensation of the interferences in symbiosis with the latter. In this case, signals of the drive train that are detected by sensors, such as rotational speeds, torques, or longitudinal accelerations are processed and compared with reference values, in order to trigger corresponding actuators as a function of a control fault. Controls of this type are generally limited in their useful bandwidth because of signal propagation times and actuator limitations. Depending on the drive topology (i.e. the construction of the engine, etc.) and the actuator quality, cut-off frequencies are typically between 10 Hz and 20 Hz, so that concepts of this type are suitable for the absorption of bucking frequencies and other low-frequency interferences, but cannot cover the entire frequency spectrum of the rotational imbalance.

It is therefore an object of the present invention to provide a system and a method which are structurally and/or functionally improved such that they can combat a wider frequency spectrum of rotational imbalances.

Embodiments of the invention provide a system for the reduction of a rotational imbalance of a drive train of a hybrid vehicle. The drive train includes an internal-combustion engine, an electric machine, and a crankshaft. A reduction or nullification of the rotational imbalance takes place by actuating the electric machine. The actuation is implemented as an adaptive feed forward control. The adaptive feed forward control provides an actuation signal for the electric machine. The actuation signal represents a desired torque to be generated by the electric machine, so that the electrical machine outputs a torque that is at least approximately inverse with respect to the rotational imbalance to the crankshaft for the superimposition of the torque generated by the internal-combustion engine.

Embodiments of the invention further provide a process for the reduction of a rotational imbalance of a drive train of a hybrid vehicle, the drive train including an internal-combustion engine, an electric machine, and a crankshaft. A reduction or nullification of the rotational imbalance takes place by an actuation of the electric machine. The actuation takes place by way of an adaptive feed forward control, which provides an actuation signal for the electric machine. The actuation signal represents a desired torque to be generated by the electric machine, so that the electric machine outputs a torque that is at least approximately inverse with respect to the rotational imbalance to the crankshaft for the superimposition of the torque generated by the internal-combustion engine.

Embodiments of the invention use the electric machine for the absorption of the rotational imbalance. In this case, the electric machine is not activated by way of a classic automatic control, which can typically absorb only low-frequency interferences of up to approximately 15 Hz, but by using an adaptive feed forward control by way of which oscillations in the audible range can also be reduced or absorbed. This approach is based on the recognition that the frequency components to be absorbed depend on the rotational engine speed, and the frequency to be absorbed is known ab initio. As a result, this knowledge can be used in the feed forward control in order to absorb or reduce the corresponding oscillations.

As a result, the quiet running of the internal-combustion engine can be increased. Likewise, unintended oscillations in the drive train can be damped. The system and the process can further be used for acoustically improving the noise of the internal-combustion engine. A further advantage is that passive absorption elements of the drive train, such as dual-mass flywheels or rotational-speed-adaptive absorbers, can be saved. This becomes possible because a high-quality function of the adaptive feed forward control can be used.

According to an advantageous further development, a rotational speed of the internal-combustion engine, which is detected by measuring, can be fed as an input variable to the feed forward control for processing. In particular, a frequency vector can be fed to the feed forward control, which can be generated from the rotational speed of the internal-combustion engine, with the frequencies that are contained in a signal representing the rotational imbalance. Correspondingly, in a further development of the process according to embodiments of the invention, a rotational speed of the internal-combustion engine, which is detected by measuring, is fed as an input variable to the feed forward control for processing. In particular, in the process according to embodiments of the invention, a frequency vector is fed to the feed forward control, which can be generated from the rotational speed of the internal-combustion engine, with frequencies that are contained in a signal representing the rotational imbalances. In this case, the frequency vector can be generated by way of a frequency generator.

In a further development of the system according to embodiments of the invention, for the adaptation of the feed forward control, a rotational speed of the electric machine detected by measuring can be fed to the feed forward control as a further input variable for the processing. The rotational speed contains a residual interference of the rotational imbalance. Analogously, in a further development of the process, for the adaptation of the feed forward control, a rotational speed of the electric machine detected by measuring is fed to the feed forward control as a further input variable for processing. The rotational speed contains a residual interference of the rotational imbalance.

In a further advantageous development, the adaptive feed forward control for the processing for predefined engine orders includes information concerning the frequencies contained in the interference signal representing the rotational imbalance. In the process, the adaptive feed forward control for predefined engine orders processes information concerning the frequencies contained in the interference signal representing the rotational imbalance.

In a further development, the adaptive feed forward control includes an interference variable monitor, which is designed for generating an A-matrix. In a manner known to the person skilled in the art, an A-matrix is used for the layout or definition of an automatic control. In this case, a damping is optionally taken into account in the A-matrix.

Other objects, advantages and novel features of the present invention will become apparent from the following detailed description of one or more preferred embodiments when considered in conjunction with the accompanying drawings.

DETAILED DESCRIPTION OF THE DRAWINGS

The following description is based on a hybrid drive train of a vehicle having an internal-combustion engine and an electric machine. The electric machine is capable of superimposing the torque path of the internal-combustion engine to the driven axle or axles. When an electric machine is mentioned in the present description, the electric machine can optionally be operated by an electric motor or a generator.

Figure 1:
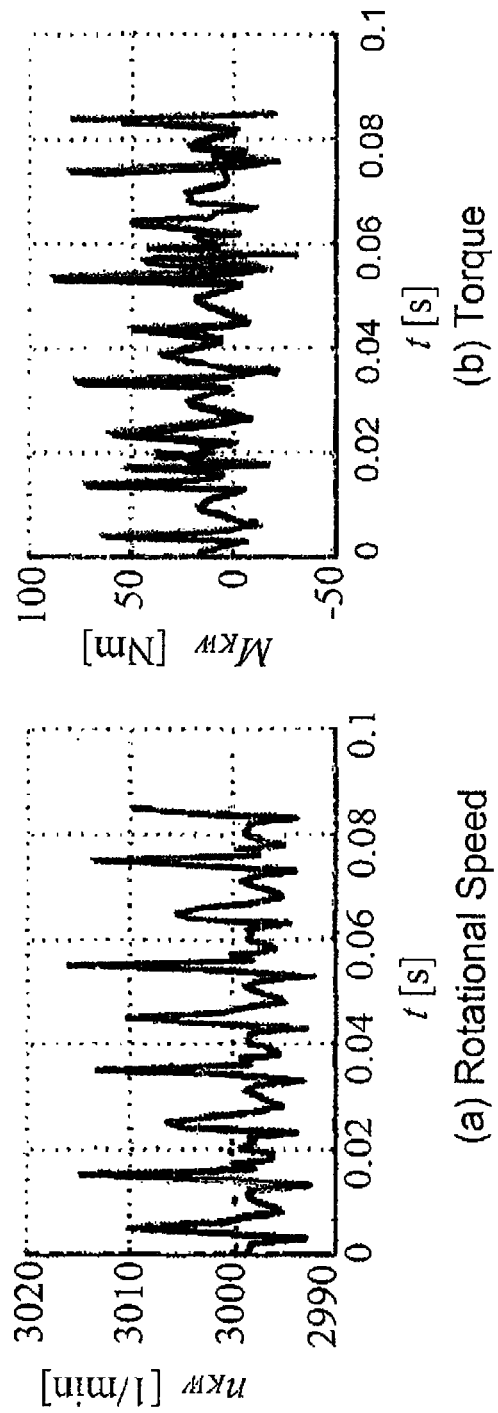
FIGS. 1a and 1b are views of a time-related detail of a rotational speed and a torque, respectively, of an internal-combustion engine of a drive train of a hybrid vehicle for illustrating a rotational imbalance during the operation of the internal-combustion engine.

As a result of free mass moments of inertia, combustion peaks, and secondary effects of the engine aggregates, the torque supplied by the internal-combustion engine has periodical interference torques. Examples are illustrated in FIGS. 1a and 1b, where a time-related detail of the rotational crankshaft speed $n_{KW}$ and the torque $M_{KW}$ existing at the crankshaft are respectively illustrated. The courses of the rotational crankshaft speed $n_{KW}$ and of the crankshaft torque $M_{KW}$ illustrated as examples in FIGS. 1a and 1b occur as a result of a constant desired rotational speed. The time-related resolution of slightly less than 0.001 s shows that periodical interferences are superimposed on the rotational speed of the crankshaft as well as the torque $M_{KW}$ present at the crankshaft. The frequency of these interference signals may either be a multiple of the rotational engine speed $n_{KW}$ or, independently thereof, assume a constant value. In the following, it is assumed that $T_{s,i}$: i∈[1, N] is one of N periodical interference signals of the combustor torque with the frequency $\omega_i$ and the amplitude $A_i$:

$$T_{s,i} = A_i \sin(\omega_i t + \varnothing) \tag{1}$$

In the following description, only an interference torque present at the crankshaft of the drive train is considered to be an interference signal. The summation of all interference torques $\Sigma_{i=1}^{N} T_{s,i}$ is called a rotational imbalance. The frequencies of the rotational-speed-dependent interference signals range approximately between $$f_{s,min} \approx 600 \; 1/min \cdot 0.5 \triangleq 5 \; Hz \tag{2}$$

for the $0.5^{th}$ engine order when idling and $$f_{s,max} \approx 8000 \; 1/min \cdot 4 \triangleq 533 \; HZ \tag{3}$$

for the fourth engine order at $n_{KW,max}$.

Which engine order(s) have to be taken into account for the reduction of the rotational imbalance of the drive train is known and depends on the considered engine. In particular, there is a dependence on the engine order with respect to the number of cylinders, with respect to the arrangement of the cylinders relative to one another (V-arrangement or bank arrangement), as well as on the concrete further development, which influences particularly the amplitude of the interference signals. In the above-indicated formulas (2) and (3), for example, for a given engine arrangement, the $0.5^{th}$ and the fourth engine order are considered. In this case, for the $0.5^{th}$ engine arrangement, a frequency of $f_{s,min}=5$ Hz is obtained for the range inaudible to humans. In contrast, the interference frequency $f_{s,max}=533$ Hz determined for the fourth engine arrangement is in the range audible to humans.

The rotational imbalance, i.e. the occurrence of the frequencies computed in Formulas (2) and (3), is to be absorbed as well as possible in the drive train in order to avoid acoustic and component stressing limits.

According to embodiments of the invention, a feed forward control is used for this purpose. The feed forward control uses as a reference, in addition to the rotational speed of the internal-combustion engine, the knowledge of simulating as well as possible frequencies contained in the non-uniformity signals, and extinguishing by way of a suitable actuator. The thus-generated signal is thereby adapted in phasing and amplitude to the interference signal. For this purpose, the feed forward control algorithm is adapted by way of a measured signal that contains the residual interference. This takes place by way of a feed forward control algorithm, which is, for example, based on an interference variable monitor. As an alternative, for example, a so-called adaptive notch filter could also be used. Furthermore, additional implementation possibilities are conceivable.

Figure 2:
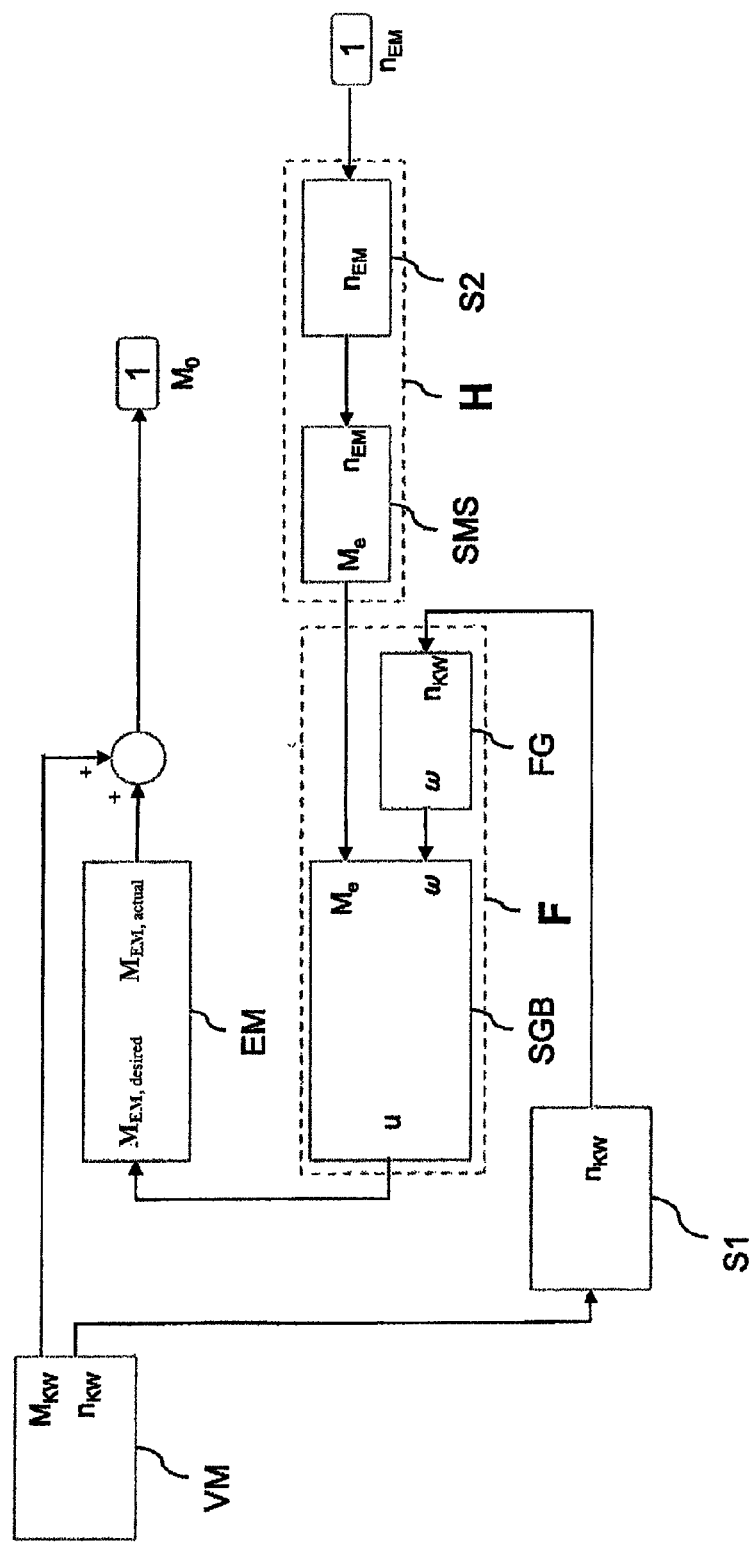
FIG. 2 is a schematic view of an embodiment according to the invention of an adaptive feed forward control for the reduction of the rotational imbalance of the drive train.

A schematic representation of the method of operation of a feed forward control is illustrated in FIG. 2. The internal-combustion engine is marked VM and the electric machine is marked EM. A first sensor S1, such as a crankshaft signal generator, and a second sensor S2, such as a rotor position sensor, are shown as further hardware components. In this case, the crankshaft signal generator S1 detects a rotational speed of the internal-combustion engine $n_{KW}$. The rotor position sensor S2 detects a rotational speed $n_{EM}$ of the electric machine.

Based on the measured rotational speed $n_{KW}$ of the internal-combustion engine VM, a frequency vector $\omega$ is formed in the block FG. The block FG represents a frequency generator. The frequency vector $\omega$ contains those frequencies that are believed to be in the interference signal. These frequencies may depend on the rotational speed $n_{KW}$ of the engine VM or may assume independent constant values. The approach for determining the frequency vector will be described in detail in the following.

In block SGB, which represents an interference variable monitor, the system dynamics of the periodical oscillations are described, which are contained in the frequency vector ω, i.e. the respective frequencies of the frequency vector. These are corrected in the SGB with respect to their phase and amplitude by way of a fault signal, are added up, and are provided as a desired torque $M_{EM,desired}$ as a control signal to the electric machine EM. The electric machine EM will then superimpose the torque $M_{KW}$ coming from the internal-combustion engine VM with the inverse value of the estimated interference $M_{EM,actual}$ in order to extinguish the interferences of the rotational imbalance. In the case of an ideal absorption of the rotational imbalance, the resulting output torque $M_o$ and therefore the rotational speed of the electric machine $n_{EM}$, which represents the current rotational speed of the electric motor EM, is smooth. A detailed description of the interference variable monitor SGB will follow.

The rotational speed of the electric machine EM measured by the rotor position sensor S2 is fed to an SMS block—an interference torque estimator. From the measured rotational speed $n_{EM}$ of the electric machine, the interference torque estimator SMS forms an estimation of the interference torque, which is situated on the crankshaft. A conceivable implementation will be further explained below.

When the rotational speed of the electric machine $n_{EM}$ is smooth under ideal conditions, the interference torque $M_e=0$. Therefore, no adaptation of the system dynamics takes place in the interference variable monitor SGB. In contrast, should an interference torque $M_e$ be present, the phasing and the amplitude of the oscillations are changed such that the fault is reduced in the next period. A learning speed 1, which is relevant in this case, will be described in detail in the description of the interference variable monitor SGB.

The frequency generator FG and the interference variable monitor SGB form the adaptive feed forward control F. The rotor position sensor S2 and the interference torque estimator SMS represent a measuring path H of a feed forward control. A control loop P, which is not explicitly illustrated in FIG. 2, is provided between the drive torque $M_o$ and the detection of the rotational speed $n_{EM}$ of the electric machine.

Figure 3:
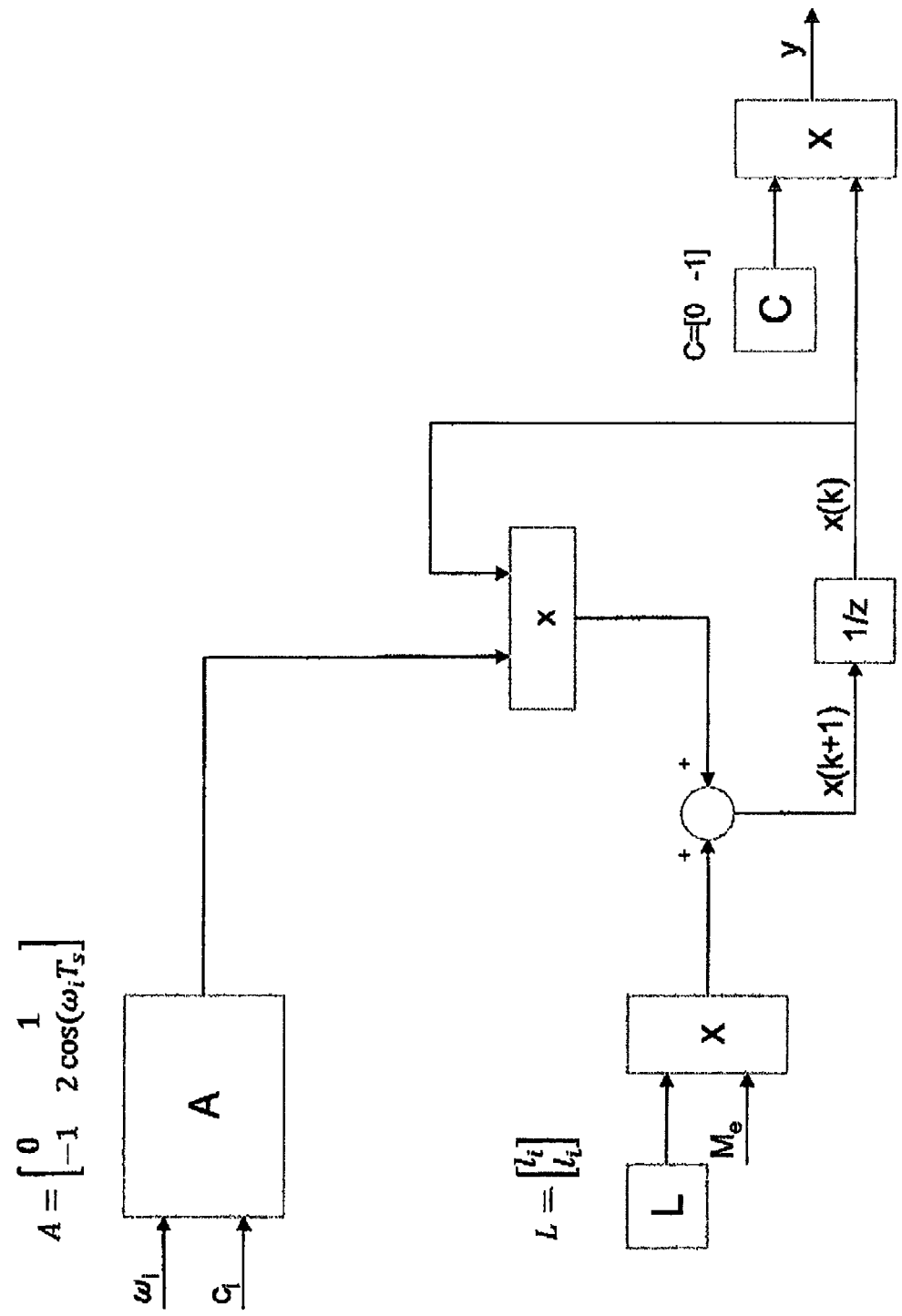
FIG. 3 is a schematic view of the automatic control concept of an interference variable monitor that can be used according to an embodiment of the invention for the implementation of the adaptive feed forward control.

The structure of the interference variable monitor SGB is illustrated in FIG. 3. The equations on which the description of the system dynamics is based are:

$$x(k+1)=A(\omega, c)x(k)+Le(k) \quad (4)$$

$$u=Cx(k) \quad (5)$$

wherein x represents a vector with the conditions of the oscillations to be imaged; A represents the matrix for the description of the system dynamics; e represents the remaining residual interference torque; and L represents the matrix of the earning speeds for the adaptation of the conditions to the measured interference dynamics. The vectors ω and c parameterize the system matrix A with respect to the frequency and the damping in the individual sinusoidal oscillations.

The dynamics of an individual vibration with the frequency $\omega_i$ and an optional damping $c_i$ in the discrete state space model are described by:

$$x_i(k+1) = A_i x_i(k) \quad (6)$$

$$y_i(k) = C_i x_i(k) \quad (7)$$

with $A_i = \begin{bmatrix} 0 & e^{-\omega_i c_i T_s} \\ -e^{-\omega_i c_i T_s} & 2e^{-\omega_i c_i T_s}\cos\left(\omega_i\sqrt{1-c_i^2}T_s\right) \end{bmatrix}$, (8)

$C_i = [1 \ 0]$ wherein $T_s$ represents a scanning time. For the superimposition of N sinusoidal oscillations, the following overall matrices are thereby obtained:

$$A = \begin{bmatrix} A_1 & \cdots & 0 \\ \vdots & \ddots & \vdots \\ 0 & \cdots & A_N \end{bmatrix}, \quad C = [C_1 \cdots C_N] \quad (9)$$

The advantage of the use of the optional damping $c_1$ is the reaching of a secure condition, whereby a stable system performance can be ensured. Should such a damping not be provided, c=0 is set, whereby a system of marginal stability is provided.

In FIG. 3, A marks an A-matrix generator to which the frequency $\omega_i$ and the damping $c_1$ are fed. The system matrix for c=0 is illustrated in FIG. 3.

In principle, there is the possibility of adapting conditions to control variable limitations and, as required, switching individual functions to be inactive. For an initial condition x(0), the selection of a vector is recommended that is part of the trajectory of a sinusoidal oscillation, in order to accelerate the transient phenomenon, for example, $$x(0)=[1 \ 1 \ \ldots \ 1]^T \quad (10)$$

The selection of the learning speeds always has to take place in pairs for the two conditions of a sinusoidal oscillation. In this case, the different frequencies can be weighted differently. Solely, the two conditions of the same frequency have to find the same learning speed:

$$L=[l_1 l_1 l_2 l_2 \ldots l_N l_N]^T \quad (11)$$

The selection of $l_i$ has to weigh the stability of the learning algorithm against the convergence time. While the selection of an $l_i$ that is too low results in an insufficient extinction quality, the selection of an $l_i$ that is too large may lead to instability.

Embodiments of the invention therefore provide the use of an adaptive feed forward control in order to absorb or at least reduce the non-uniformity of an internal-combustion engine by way of an electric machine. The adaptive feed forward control utilizes the knowledge that the frequency components to be absorbed depend on the rotational speed of the engine and their frequency is known for any engine order.

In the above description, only an interference variable monitor is described for implementing a solution. It is also easily conceivable to implement such a concept by way of an LMS filter or similar variants.

LIST OF REFERENCE SYMBOLS

VM Internal-combustion engine
EM Electric machine
S1 Sensor (crankshaft generator)
S2 Sensor (rotor position sensor)
FG Frequency generator
SGM Interference variable monitor
$n_{EM}$ Rotational speed of the electric machine $n_{KW}$ Rotational speed of the internal-combustion engine
$M_{KW}$ Torque of the internal-combustion engine
$M_{EM.des}$ Desired torque of the electric machine
$M_{EM.act}$ Actual torque of the electric machine
$M_o$ Drive torque
F Feed forward control
H Measuring path The foregoing disclosure has been set forth merely to illustrate the invention and is not intended to be limiting. Since modifications of the disclosed embodiments incorporating the spirit and substance of the invention may occur to persons skilled in the art, the invention should be construed to include everything within the scope of the appended claims and equivalents thereof.

What is claimed is:

1. A system for reducing a rotational imbalance of a drive train of a hybrid vehicle, wherein the drive train includes an internal-combustion engine, an electric machine, and a crankshaft, the system comprising:
   an adaptive feed forward control that provides an actuation signal for actuating the electric machine, wherein:
      the actuation signal represents a desired torque to be generated by the electric machine, so that the electric machine outputs a torque that is at least approximately inverse with respect to the rotational imbalance,
      the adaptive feed forward control is configured to receive an estimate of an interference torque generated by an interference torque estimator based on a rotational speed of the electric machine,
      the adaptive feed forward control includes an interference variable monitor configured to
         receive a frequency vector from a frequency generator based on a rotational speed of the internal combustion engine, the frequency vector being in the form of a matrix $A(\omega,c)$, where $\omega$ represents a vector of individual frequencies corresponding to expected periodic oscillations associated with the rotational speed of the internal-combustion engine and c represents a vector of corresponding individual damping quantities,
         generate an expected oscillations vector in the form of $x(k+1)$, where $x(k+1)=A(\omega, c)x(k)+Le(k)$, $x(k)$ represents a previously determined expected oscillations vector and $Le(k)$ represents a matrix of learning speeds for adaptation in response to the estimated interference torque, and
         generate the actuation signal for actuating the electric machine in the form of a desired electric machine output torque, the desired electric machine output torque being in the form of $u=Cx(k)$, where C is a vector related to the frequency vector matrix $A(\omega, c)$ by the relationships of $$A_i = \begin{bmatrix} 0 & e^{-\omega_i c_i T_s} \\ -e^{-\omega_i c_i T_s} & 2e^{-\omega_i c_i T_s}\cos\left(\omega_i\sqrt{1-c_i^2}T_s\right) \end{bmatrix}, C_i = [1\ 0]$$

for an ith individual frequency $\omega_i$ and ith individual damping $c_i$ in a scanning time $T_s$ between k and k+1 cycles of the adaptive feed forward control, and $$A = \begin{bmatrix} A_1 & \cdots & 0 \\ \vdots & \ddots & \vdots \\ 0 & \cdots & A_N \end{bmatrix}, C = [C_1 \ldots C_N],$$

corresponding to superposition of N sinusoidal oscillations, and
   the adaptive feed forward control is configured to forward the actuation signal to the electric machine to as a control signal for generating and applying the desired electric machine output torque by the electric machine to the crankshaft for superimposition on a torque generated by the internal-combustion engine.

2. The system according to claim 1, wherein the frequency vector includes individual frequencies corresponding to expected periodic oscillations associated predefined engine orders.

3. A method for reducing a rotational imbalance of a drive train of a hybrid vehicle, wherein the drive train includes an internal-combustion engine, an electric machine, and a crankshaft, the method comprising:
   actuating the electric machine in response to an actuation signal provided by an adaptive feed forward control, wherein the actuation signal represents a desired torque to be generated by the electric machine, so that the electric machine outputs a torque that is at least approximately inverse with respect to the rotational imbalance,
   wherein the act of actuating the electric machine includes
      receiving by the adaptive feed forward control an estimate of an interference torque generated by an interference torque estimator based on a rotational speed of the electric machine,
      generating with a frequency generator of the adaptive feed forward control a frequency vector from a frequency generator based on a rotational speed of the internal combustion engine, the frequency vector being in the form of a matrix $A(\omega, c)$, where $\omega$ represents a vector of individual frequencies corresponding to expected periodic oscillations associated with the rotational speed of the internal-combustion engine and c represents a vector of corresponding individual damping quantities,
      receiving the frequency vector by an interference variable monitor of the adaptive feed forward control,
      generating with the interference variable monitor, based on the frequency vector $A(\omega, c)$ received from the frequency generator, an expected oscillations vector in the form of $x(k+1)$, where $x(k+1)=A(\omega, c)x(k)+Le(k)$, $x(k)$ represents a previously determined expected oscillations vector and $Le(k)$ represents a matrix of learning speeds for adaptation in response to the estimated interference torque, and
      generating with the interference variable monitor the actuation signal for actuating the electric machine in the form of a desired electric machine output torque, the desired electric machine output torque being in the form of $u=Cx(k)$, where C is a vector related to the frequency vector matrix $A(\omega, c)$ by the relationships of $$A_i = \begin{bmatrix} 0 & e^{-\omega_i c_i T_s} \\ -e^{-\omega_i c_i T_s} & 2e^{-\omega_i c_i T_s}\cos\left(\omega_i\sqrt{1-c_i^2}T_s\right) \end{bmatrix}, C_i = [1\ 0]$$

for an ith individual frequency $\omega_i$ and ith individual damping $c_i$ in a scanning time $T_s$ between k and k+1 cycles of the adaptive feed forward control, and $$A = \begin{bmatrix} A_1 & \cdots & 0 \\ \vdots & \ddots & \vdots \\ 0 & \cdots & A_N \end{bmatrix}, C = [C_1 \ldots C_N],$$

corresponding to superposition of N sinusoidal oscillations,
generating with the electric machine the desired electric machine output torque in response to the actuation signal output by the adaptive feed forward control to the electric machine, and
applying the desired electric machine output torque generated by the electric machine to the crankshaft for superimposition on a torque generated by the internal-combustion engine.

4. The method according to claim 3, wherein the frequency vector includes individual frequencies corresponding to expected periodic oscillations associated predefined engine orders.

* * * * *